INVENTOR.
MEINHARD TRUPPE
MATTHIAS SCHERANTHANER
GUNTER PFERL
BY
Brumbaugh, Graves, Donohue
+ Raymond 3,647,560
MEASURING LANCE FOR CONTINUOUSLY MEASURING THE TEMPERATURE OF METAL BATHS
Meinhard Truppe, Matthias Schernthaner, and Günter Poferl, Linz, Austria, assignors to Vereinigte Osterreichische Eisen- und Stahlwerke Aktiengesellschaft, Linz, Austria
Filed May 12, 1969, Ser. No. 823,858
Claims priority, application Austria, May 15, 1968, 4,656/68, 4,658/68
Int. Cl. G01k 1/12; H01v 1/02
U.S. Cl. 136—234
3 Claims

ABSTRACT OF THE DISCLOSURE

A measuring lance used for continuously measuring the temperature of metal baths during refining by top-blowing oxygen with the aid of a blowing lance is described. The measuring lance is introduced with its sensing portion into a hot metal bath and is adjusted to a predetermined distance from the axis of said blowing lance, clear of the refractory, and to a predetermined depth below the initial metal bath surface for the duration of the measuring process. In the intervals between measurements continued over a plurality of heats, the sensing portion of the measuring lance is kept hot by introducing it into a warming chamber arranged outside the converter. The measuring lance comprises a sheath tube supporting a thermocouple-containing capillary tube, connection of the thermocouple branches to their compensating line being accomplished by connecting them to a coaxial plug socket joined to be integral with said capillary tube by a sleeve of insulating material.

---

Figure 1:
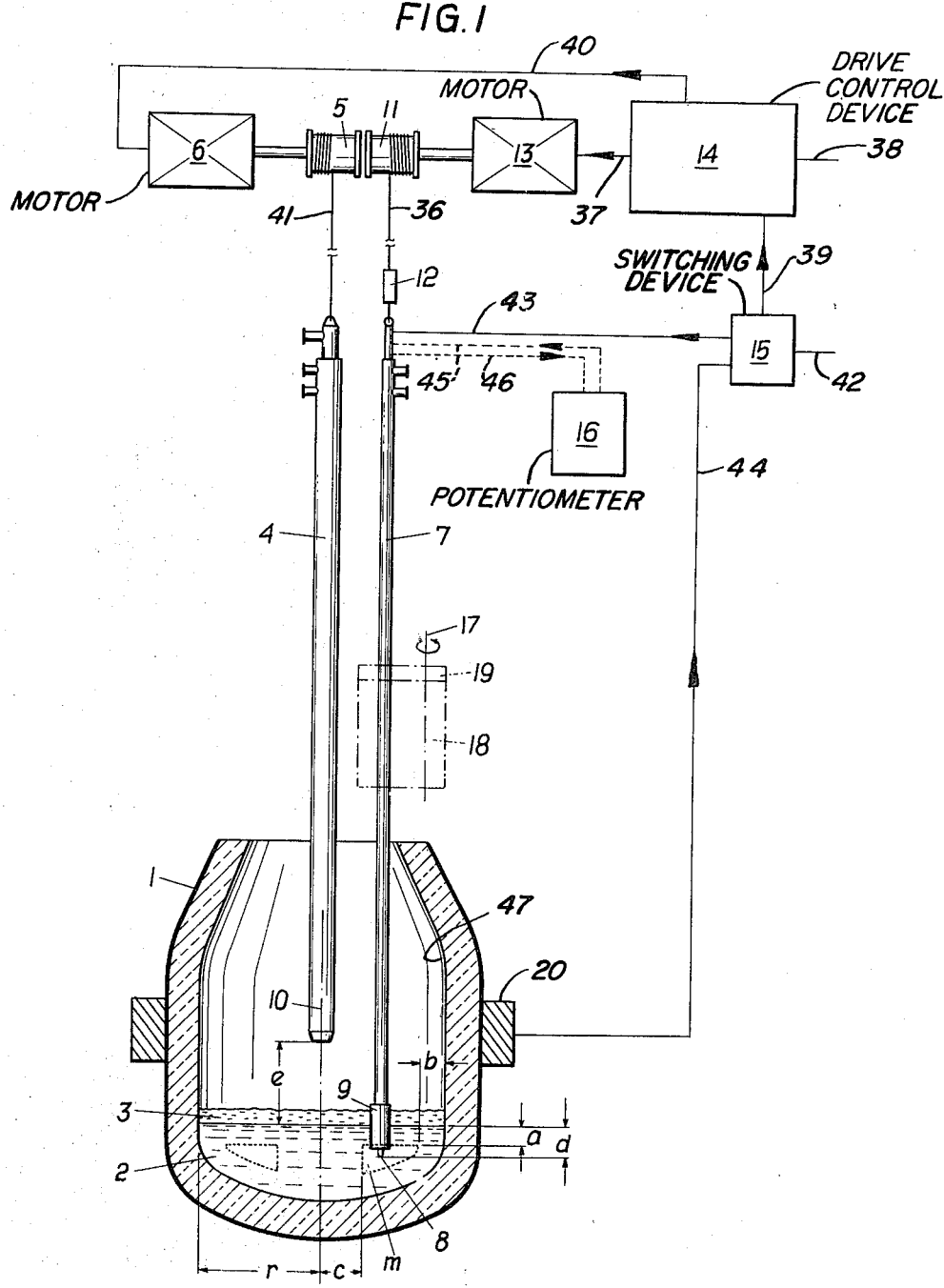

The invention relates to a measuring lance preferably used for continuously measuring the temperature of metal baths during a refining process or during a series of successive refining processes in converters, wherein oxygen is blown onto the bath by means of a blowing lance and the measuring lance is inserted into the bath.

When carrying out refining processes in converters, efforts are made to obtain a continuous record of the temperature behavior in the metal bath, because said temperature behavior imparts characteristic values on the progress of refining, which values may serve for an automatic control of the refining operation. It has been proposed to place immersion pyrometers laterally through the converter shell and the converter brickwork into the bath. Permanent measurements have, however, been difficult as replacement of the measuring device presents a problem, as the measuring device is liable to be damaged during scrap charging, and as the measuring results may be influenced by the temperature of the converter brickwork.

It is also known to use temperature measuring instruments lowerable from the top into the hot metal bath, such devices containing a thermocouple encased by a sheath tube of highly refractory material, which forms the tip of a water-cooled, lift- and lowerable lance. As the slag layer floating on the bath must be pierced when introducing the measuring instrument from the top, that part of the measuring instrument extending in the slag region must be highly resistant, as the slag is much more aggressive than the metal bath. Very resistant, highly refractory materials on a ceramic basis must be used in order to protect the sensing portion. When such measuring lances lowerable from the top into the hot metal bath are permanently used, again the difficulty arises that the indicating accuracy is not sufficient to obtain values utilizable for an automatic control of the process, unless the measurements are carried out within a centrally-positioned, annularly shaped region. This is due to the fact that the temperature during refining is not the same throughout the hot metal bath.

It has been found that reliable measuring values characteristic of the progress of refining can be obtained if measurements are carried out within a centrally-positioned, annularly-shaped region of the bath, and that such values are best obtained if the difference between the temperature of the metal bath and the temperature of the measuring instrument is a small as possible when measuring is commenced.

A preferred use of the invention resides in maintaining a constant distance of between one third of the distance of the blowing lance axis from the refractory brickwork and a point at least 200 mm. removed from the refractory brickwork between the axis of the blowing lance and the sensing point of the measuring lance, and adjusting the sensing point of the inventive measuring lance, for the duration of the measuring process, to a constant depth of at least 200 mm. below the level of the metal bath as measured before the beginning of the blowing process, and in the case of continued measurements in successive heats subsequent, the sensing portion of the measuring lance at a temperature of at least 1000° C. during intervals between measurements. Maintaining a constant distance between the axis of the blowing lance and the sensing point of the measuring lance as well as constantly maintaining a definite measuring depth guarantee that the measured values always originate from the same bath region without being increased by temperature influences due to a too close-lying hot spot or decreased due to a too small distance from the refractory lining. The additional feature of keeping the sensing portion of the lance hot during intervals, between heats avoids the previously known indicating lag at the outset of the process and provides for the measurements being accurate from the start.

In the preferred use of the inventive measuring lance, the sensing point of the measuring lance is adjusted to a constant depth below the level of the metal bath as measured before blowing is started, the adjustment of the lance being made in dependency upon an electric circuit being closed by the measuring lance touching the bath surface. The measuring level is thus automatically adjusted and rendered independent of guesses or errors made by the operators. During intervals, the measuring device is preferably kept hot by introducing the sensing portion of the lance into a warming chamber arranged outside the converter, adapted to be airtightly sealed, suitably filled with inert gas, and having a temperature of at least 1000° C.

In order to carry out the above described process of continuously measuring temperature baths, the construction of the measuring lance is of importance, especially the construction of the sensing portion thereof which may be introduced from above into the bath to be measured. This sensing portion has to be designed in a manner that the connection of the limbs of the thermocouple with the compensating line leading outside is neither mechanically nor thermally stressed, for only then the measuring lance is suited for continuous measurements lasting throughout the overall duration of the heat.

The known measuring lances having a sensing portion comprising a metallic or metal-ceramic sheath tube, into which sheath tube a capillary tube containing a thermocouple is inserted, the limbs of the thermocouple being connected via a plug connection to the compensating line, have not been adequate for continuous measurements because the plug connection is unprotected and cannot accommodate longitudinal expansion displacements.

In the measuring lance according to the invention this problem is solved in that the limbs of the thermocouple are connected to the socket of a coaxial plug, the capillary tube and the socket being joined by a sleeve of electrically insulating material to form an integral and replaceable unit.

The capillary tube and the socket are suitably connected by means of a cast resin.

The sleeve is preferably provided with a guide flange whose outer diameter is smaller than the diameter of the inner wall of the sheath tube so that the exchangeable construction element may follow axial movements.

Figure 2:
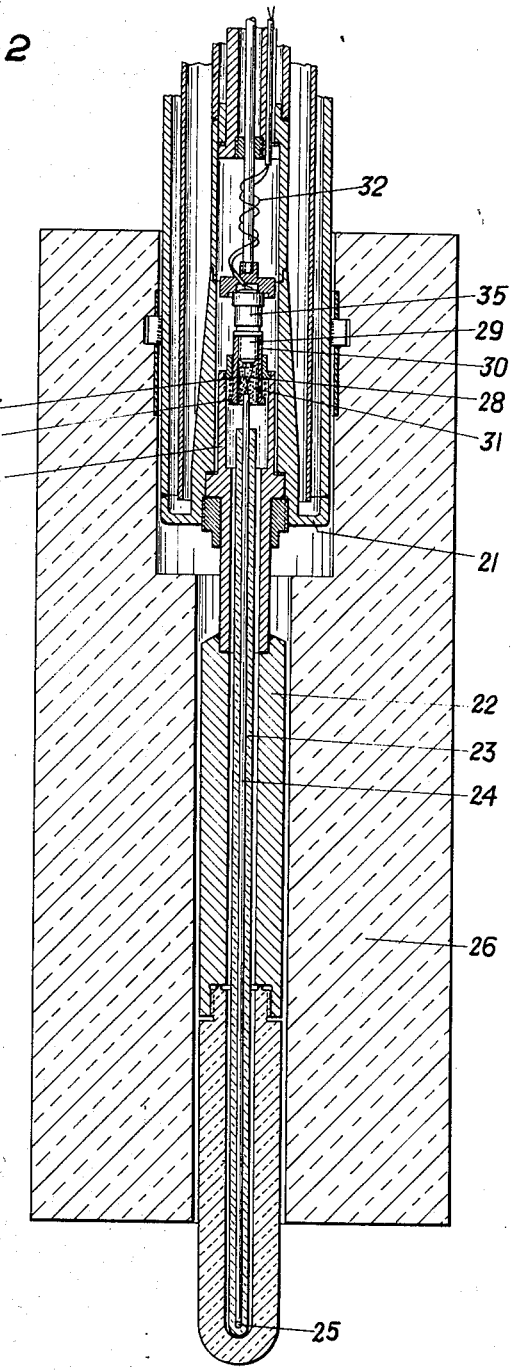

The preferred method for utilizing the inventive measuring lance and the measuring lance itself are explained in greater detail with reference to the accompanying drawings. FIG. 1 is a diagrammatical view of the total arrangement; FIG. 2 is a section through the sensing portion of the measuring lance.

In FIG. 1 numeral 1 denotes a converter with a carrier ring 20 wherein a metal bath 2 is covered by a slag layer 3. A lift- and lowerable blowing lance 4 is arranged vertically above the center of the bath. Oxygen is blown onto the bath by means of said lance, and a hot reaction spot forms in the central area of the bath surface, the refining reactions emanating therefrom. The blowing lance 4 is suspended on a rope 41 that is supported on a rope winch 5, such rope winch 5 being driven by a rope winch motor 6. Numeral 7 denotes the inventive lift and lowerable measuring lance for measuring the bath temperature, the measuring lance 7 being suspended by a rope 36 which is connected to a rope winch 11. The rope winch 11 is driven by a motor 13. The lances 4 and 7 should be maintained a constant lateral distance apart when they are lifted and lowered. The measuring lance 7, as well as the blowing lance 4, is water-cooled and dips into the metal bath 2 with its sensing portion 9; the sensing point of the portion 9 is denoted by numeral 8. The sensing portion is protected by a refractory jacket 26 (FIG. 2) in the region of the slag layer 3. FIG. 1 shows that the temperature measurements are taken within a well-defined region of the bath 2, the region designated by $m$. This region lies at a distance $a$ from the bath surface, said distance $a$ amounting preferably to 200 mm., and at a distance $b$, also preferably amounting to 200 mm., from the refractory lining 47. Between the axis 10 of the blowing lance 4 and the measuring region $m$ a distance $c$ is maintained, said distance $c$ being preferably one third of the distance $r$ which is the distance between the axis of the blowing lance and the refractory lining 47. The lateral distance between the axis of the lances 4 and 7 is somewhat larger than the distance $c$. All temperature measurements are taken within said region $m$ and at a constant point thereof.

The automatic lowering of the measuring lance to the desired measuring region $m$ is effected by means of the electric control apparatus shown in the FIG. 1: the measuring lance 7 is electrically insulated from rope 36 by means of an interposed insulator 12. The motor 13 of the rope winch 11 is connected to a lance drive control device 14 by means of an electric conductor 37, such control device 14 being connected on the one hand to mains 38 and, on the other hand, by an electric conductor 39 to a low-voltage switching device 15. The control device 14 is also connected by an electric conductor 40 to motor 6 which actuates the rope winch 5 of the blowing lance 4. The low-voltage switching device 15 is connected to a low-voltage current source by means of conductor 42.

The insulatedly suspended measuring lance 7 acts as a switching element in determining the bath surface level. As soon as the tip of the measuring lance touches the bath surface an electric circuit is completed through electric conductors 43 and 44 which connect the low-voltage switching device 15 to the electrically conductive measuring lance 7 and via the electrically conductive carrier ring 20 to the electrically conductive converter 1. The completed electric circuit activates a relay (not shown) in the low-voltage switching device 15 which, in turn, activates the control device 14 to turn off the motor 13, stop the winch 11, and bring the measuring lance 7 to a standstill. The lance drive control device 14 also includes control means (not shown) which is then activated to automatically lower the lance 7 a preselected distance $d$, said distance $d$ corresponding to the distance of the sensing point of the lance from the bath surface. This distance $d$ preferably is greater than 200 mm. 16 is an indicating potentiometer for recording the temperature measurements. Potentiometer 16 is connected to a thermocouple (FIG. 2) of the sensing portion 9 by conductors 45 and 46. The completion of the low-voltage circuit (when the sensing point 8 touches the metal bath 2) may also be used for adjusting the distance $e$ of the blowing lance above the metal bath surface. For this purpose an additional control means (not shown) is provided in the lance drive control device 14 for automatically switching off the motor 6 when the predetermined distance $e$ is reached and bringing the blowing lance 10 to a standstill. The arrows in FIG. 1 show in simplified manner the signal direction of the electrical current and control circuits.

When measuring is terminated, the measuring lance is withdrawn from the converter. Thereupon, the warming chamber 18 which is arranged to be rotatable around a vertical axis 17 is swung into the position shown in broken lines, the hinged lid 19 is hinged open and the sensing portion of the measuring lance is lowered into the warming chamber. During intervals, the warming chamber is closed by its lid. It may be filled with inert gas.

FIG. 2 illustrates the sensing portion of the inventive measuring lance in detail. Numeral 21 denotes a water-cooled probe head to which a sheath tube 22 is attached. The sheath tube 22 encases a gas-tight tube 23 housing a capillary tube 24 which contains the limbs of a thermocouple. The hot junction at the lower end is designated by 25. The sheath tube 22 is surrounded by a jacket 26 made of refractory material. The limbs 27, 28 of the thermocouple, which project from capillary tube 24, are connected to the socket 29 of a coaxial plug, as evident from the drawing. The end of capillary tube 24, the socket 29 and the sleeve 30 made of electrically insulating material, such as plastics, are bonded by means of a cast resin 31 to form an integral part. The capillary tube with the thermocouple, the sleeve and the socket thus constitute a single, replaceable unit. Numeral 35 denotes a plug which is insertable into the coaxial socket. Lines 32 lead from said plug to the indicating device. It is further evident from the drawing that the sleeve 30 has a flange 33 sliding along the inner wall of tube 34, which is an extension of sheath tube 22. Since the sleeve 30 slides within the tube 34, the sleeve 30 and thus the integral and replaceable unit are adapted to follow axial movements.

What we claim is:

1. A sensing portion for a water-cooled measuring lance for continuously measuring the temperature of metal baths during refining operations, said sensing portion comprising
   a sheath tube,
   a capillary tube positioned within the sheath tube,
   a thermocouple positioned within said capillary tube and having two limbs,
   a plug adapted to engage a socket to which said thermocouple limbs are connected,
   a sleeve joining together said capillary tube and said socket to form an integral and replaceable unit, said sleeve being of electrically insulating material, and means mounting said integral and replaceable unit to provide for axial movement of said unit in said sheath tube.

2. The measuring lance set forth in claim 1 wherein the capillary tube, the sleeve and the socket are joined together by means of a resinous material.

3. The sensing portion of claim 1 wherein the sleeve is provided with a guide flange having an outer diameter smaller than the diameter of the inner wall of the sheath tube.

References Cited

UNITED STATES PATENTS

| 3,011,006 | 11/1961 | Nicholson et al. | 136—234 X |
| 3,038,951 | 6/1962 | Mead | 136—234 |
| 2,463,427 | 3/1949 | Richards | 73—359 |
| 3,277,716 | 10/1966 | Cox | 73—359 |
| 3,306,783 | 2/1967 | Silver | 73—359 X |
| 3,327,531 | 6/1967 | Fradeneck | 73—359 |
| 3,374,122 | 3/1968 | Cole | 73—359 X |

LOUIS R. PRINCE, Primary Examiner

F. SHOON, Assistant Examiner

U.S. Cl. X.R.

73—343 R, 359

PO-1050
(5/69)

UNITED STATES PATENT OFFICE
CERTIFICATE OF CORRECTION

Patent No. 3,647,560     Dated March 7, 1972

Inventor(s) M. Truppe et al

It is certified that error appears in the above-identified patent and that said Letters Patent are hereby corrected as shown below:

Col. 2, line 25, "subsequent," should read --, maintaining--.

Signed and sealed this 13th day of June 1972.

(SEAL)
Attest:

EDWARD M. FLETCHER, JR.
Attesting Officer

ROBERT GOTTSCHALK
Commissioner of Patents